US010548310B2

(12) United States Patent
Giese

(10) Patent No.: US 10,548,310 B2
(45) Date of Patent: Feb. 4, 2020

(54) PERIPHERALLY BUOYANT COLLAPSIBLE DECOY MOUNTING DEVICE

(71) Applicant: Ross Giese, Lake Geneva, WI (US)

(72) Inventor: Ross Giese, Lake Geneva, WI (US)

(*) Notice: Subject to any disclaimer, the term of this patent is extended or adjusted under 35 U.S.C. 154(b) by 216 days.

(21) Appl. No.: 15/848,341

(22) Filed: Dec. 20, 2017

(65) Prior Publication Data

US 2018/0192636 A1 Jul. 12, 2018

Related U.S. Application Data

(60) Provisional application No. 62/437,044, filed on Dec. 20, 2016.

(51) Int. Cl.
*A01M 31/06* (2006.01)

(52) U.S. Cl.
CPC .................................. *A01M 31/06* (2013.01)

(58) Field of Classification Search
CPC .................................................. A01M 31/06
USPC .......................................................... 43/3, 2
See application file for complete search history.

(56) References Cited

U.S. PATENT DOCUMENTS 694,732 A 3/1902 Coudon
710,433 A 10/1902 Coudon
1,376,282 A 4/1921 Kauffman
1,746,640 A 2/1930 Emoff
2,246,574 A 6/1941 Coe
2,435,083 A 1/1948 Johnson
2,547,286 A 4/1951 Sabin
2,616,200 A 11/1952 Milam
2,624,144 A 1/1953 Beverman
2,726,469 A * 12/1955 Becker .................. A01M 31/06 43/3
2,787,074 A * 4/1957 Miller .................. A01M 31/06 43/3
2,952,090 A 9/1960 Pittenger
3,021,635 A 2/1962 Sheridan
4,120,110 A 10/1978 Aeschliman
4,660,313 A 4/1987 Bauernfeind et al.
5,074,071 A 12/1991 Dunne
5,293,709 A 3/1994 Cripe
6,079,140 A 6/2000 Brock, IV
6,442,885 B1 9/2002 Payne
6,634,133 B1 10/2003 Levandowski
6,655,071 B2 12/2003 Barnes et al.

(Continued)

FOREIGN PATENT DOCUMENTS

CA 2922176 A1 * 10/2016 ............ A01M 31/06

*Primary Examiner* — Christopher P Ellis
(74) *Attorney, Agent, or Firm* — von Briesen & Roper, s.c.; Patrick M. Bergin

(57) ABSTRACT

A decoy buoy for holding a plurality of waterfowl decoys that comprises a buoyant ring having mounting holes equally spaced about the outside periphery and/or the inner periphery. The mounting holes are further adapted for mounting a waterfowl decoy and/or an anchoring device to prevent the decoy buoy from floating away while in the water. The ring having a height that is generally less than or equal to the distance between the outside periphery and the inner periphery of the ring. The ring further being constructed from two buoy sections and joined with hinges that provide both a fold-flat configuration and an unfolded stable semi-rigid circular configuration adapted for placement upon or near the surface of water.

22 Claims, 12 Drawing Sheets

1
2
3
4
5
5A
6
6

(56) References Cited

U.S. PATENT DOCUMENTS

| | | | | |
|---|---|---|---|---|
| 6,957,509 | B2 | 10/2005 | Wright | |
| 7,043,865 | B1 | 5/2006 | Crowe | |
| 7,137,221 | B2 | 11/2006 | Highby et al. | |
| 7,322,144 | B2 | 1/2008 | Brewer | |
| 7,347,024 | B1 * | 3/2008 | Vest | A01M 31/06 43/3 |
| 8,506,339 | B2 * | 8/2013 | Fletcher | A01M 31/06 43/3 |
| 8,950,103 | B2 | 2/2015 | Bullerdick et al. | |
| 9,572,339 | B1 * | 2/2017 | Dicken | A01M 31/06 |
| 2003/0204983 | A1 * | 11/2003 | Porter | A01M 31/06 43/3 |
| 2008/0301995 | A1 * | 12/2008 | Brittingham, Jr. | A01M 31/06 43/3 |
| 2013/0212924 | A1 * | 8/2013 | Shisko | A01M 31/06 43/2 |
| 2015/0027028 | A1 * | 1/2015 | Steinberg | A01M 31/06 43/2 |
| 2015/0313207 | A1 * | 11/2015 | Anson | F16M 11/00 43/3 |
| 2016/0100569 | A1 * | 4/2016 | Hudson | A01M 31/06 43/3 |
| 2016/0150773 | A1 * | 6/2016 | Loosier | A01M 31/06 43/3 |
| 2017/0332621 | A1 * | 11/2017 | Macias | A01M 31/06 |
| 2019/0021305 | A1 * | 1/2019 | Carvalho | A01M 31/06 |

* cited by examiner 1
2
2B
3
3B
4
5
6
6
7
7
7
7
7
7
8
8
8
8
8
8
8
8

3
7
9
7
3A
9
7
8
8
8

3
9
8
3B
8
7
8
8
7
10
9

11
3A
3B 13
7
8
9

16
18
17
15

16
17
15

16
18
17
15

16
15

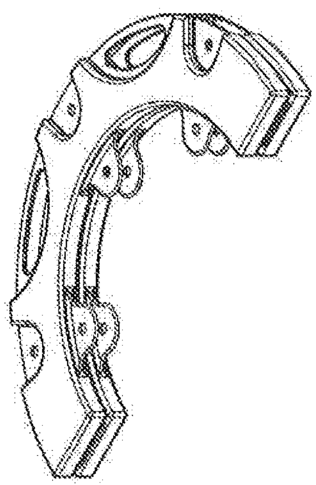
FIGURE 17
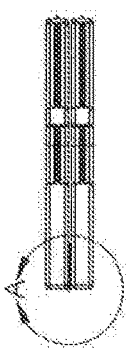
FIGURE 19
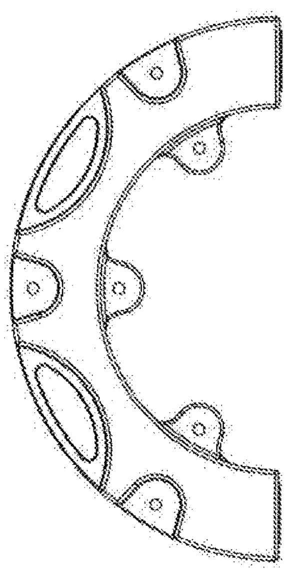
FIGURE 16
FIGURE 18
19
20
21
DETAIL A
FIGURE 20

FIGURE 22
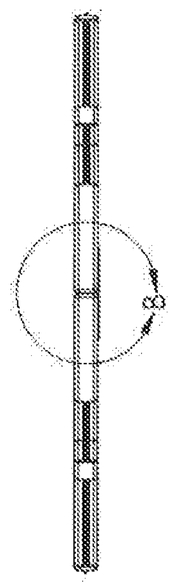
FIGURE 21
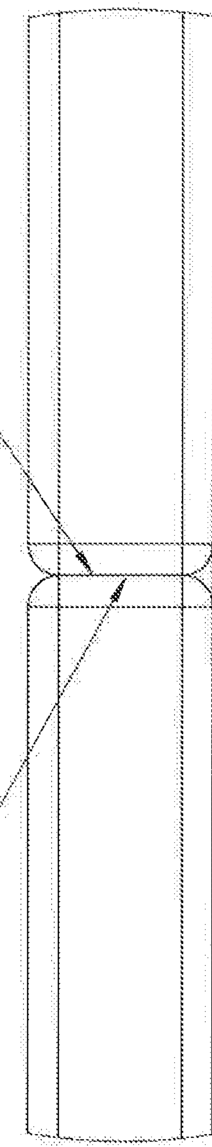
FIGURE 23

PERIPHERALLY BUOYANT COLLAPSIBLE DECOY MOUNTING DEVICE

FIELD OF THE INVENTION

The invention relates to a new and improved mounting device for decoys used for hunting. Specifically, the invention relates to a peripherally buoyant and collapsible mounting platform for decoys.

BACKGROUND OF THE INVENTION

Evidence has shown that man used decoys while hunting waterfall as early as 2000 years ago. Early decoys were made from the available materials of the day and could be found in two dimensional and three dimensional configurations depending on the skill of the person making the decoy. They were often woven from dried vegetation and mounted on reeds which were then stuck into the mud while the birdlike decoy stayed above the water. While being somewhat effective at deceiving ducks and geese flying high overhead, their crude appearance was less than fully convincing in closer proximity. Weaponry was limited to crude bows and arrows having limited range and questionable accuracy. In addition, the rigid mounting method prevented the decoys from naturally bobbing upon the surface of the water as real ducks or geese would do. The need to draw birds in closer and in greater numbers would drive innovation.

Improvements to decoy design execution would include the use of buoyant materials that could be carved into realistic profiles, painted to look like species that would migrate through the area, and configured for flexible anchorage while maintaining floatation on the surface of the water. Modern decoys are often injection molded from various polymers with details that can fool the hunter as well as the hunted. They are often painted or otherwise decorated to reproduce the coloration and overall appearance of natural feathers while providing durability for continued reuse.

Often these decoys are configured to duplicate the appearance of a duck or goose floating on the surface of the water, or alternately the duck or goose standing on land and posed to look like it is eating, sleeping, or alert and looking for a mate. Decoys configured for standing are often used in fields that are freshly plowed. They can be deployed in significant numbers and are typically not buoyant. Waterfowl passing over in flight may observe the decoys, believe that they are live birds feeding on the grain that has fallen on the ground as a result of harvesting, and land to feed as well. Modern decoys of this type are often constructed so that they may generate life-like motion as the result of wind blowing against them. This motion helps make the decoys appear to be more realistic. The more realistic appearance is likely to attract greater numbers of birds. In contrast, water based floating decoys are often used to attract waterfowl that is looking for a place to rest safely on the water and away from predators.

During fall migration, is very common to see significant numbers of ducks and or geese floating upon the surface of the water. The depth of the water in a lake, pond, creek, or river often protects waterfowl from many predators, such as fox, coyotes, dogs, badgers, etc. Therefore, waterfowl decoys that float upon the water are used to attract birds that need a safe place to rest. An ideal habitat for waterfowl may be a body of water having a depth suitable for flotation around its periphery and shallower portions a safe distance from shore suitable for the collection of water-borne insects or other desirable nourishment by waterfowl that could support its own weight while standing. Unfortunately, ponds and rivers seldom have these combined features.

The known prior art relies upon the use of buoyant decoys or otherwise utilizes folding "V" shaped boards such as those described and shown in U.S. Pat. No. 6,655,071. A problem with prior technology is that it is not peripherally buoyant, which makes it unsuitable for use with non-buoyant decoys. What is needed is a need for a decoy buoy that allows non-buoyant decoys to be used in the absence of land or shallow water.

SUMMARY OF THE INVENTION

It is therefore an object of this invention to provide a decoy buoy that may allow non-buoyant decoys to be deployed upon the surface of the water for any purpose including the visual simulation of birds feeding in shallow water or on small islands. It is another object of this invention to provide adjustable buoyancy so that a standing type decoy may be positioned entirely above the water or partially submerged according to the desire of the hunter. It is yet a further object of this invention to provide means for collapsing, stowing, and transporting the decoy buoy without disassembly. It is yet another object of this invention to provide a decoy buoy that is peripherally buoyant.

BRIEF DESCRIPTION OF THE DRAWINGS

FIG. 16 is a top view of a circular shaped decoy buoy in a folded or closed configuration.

FIG. 17 is an isometric top view of a circular shaped decoy buoy in a folded or closed configuration.

FIG. 18 is an end view of a circular shaped decoy buoy in a folded or closed configuration.

FIG. 19 is a side view of a circular shaped decoy buoy in a folded or closed configuration.

FIG. 20 is a detail end view of the decoy buoy in a folded or closed configuration.

FIG. 21 is a side view of the decoy buoy in a flat or open configuration.

FIG. 22 is an end view of the decoy buoy in a flat or open configuration.

FIG. 23 is a detail side view of the decoy buoy in a flat or open configuration.

DETAILED DESCRIPTION OF THE INVENTION

Figure 1:
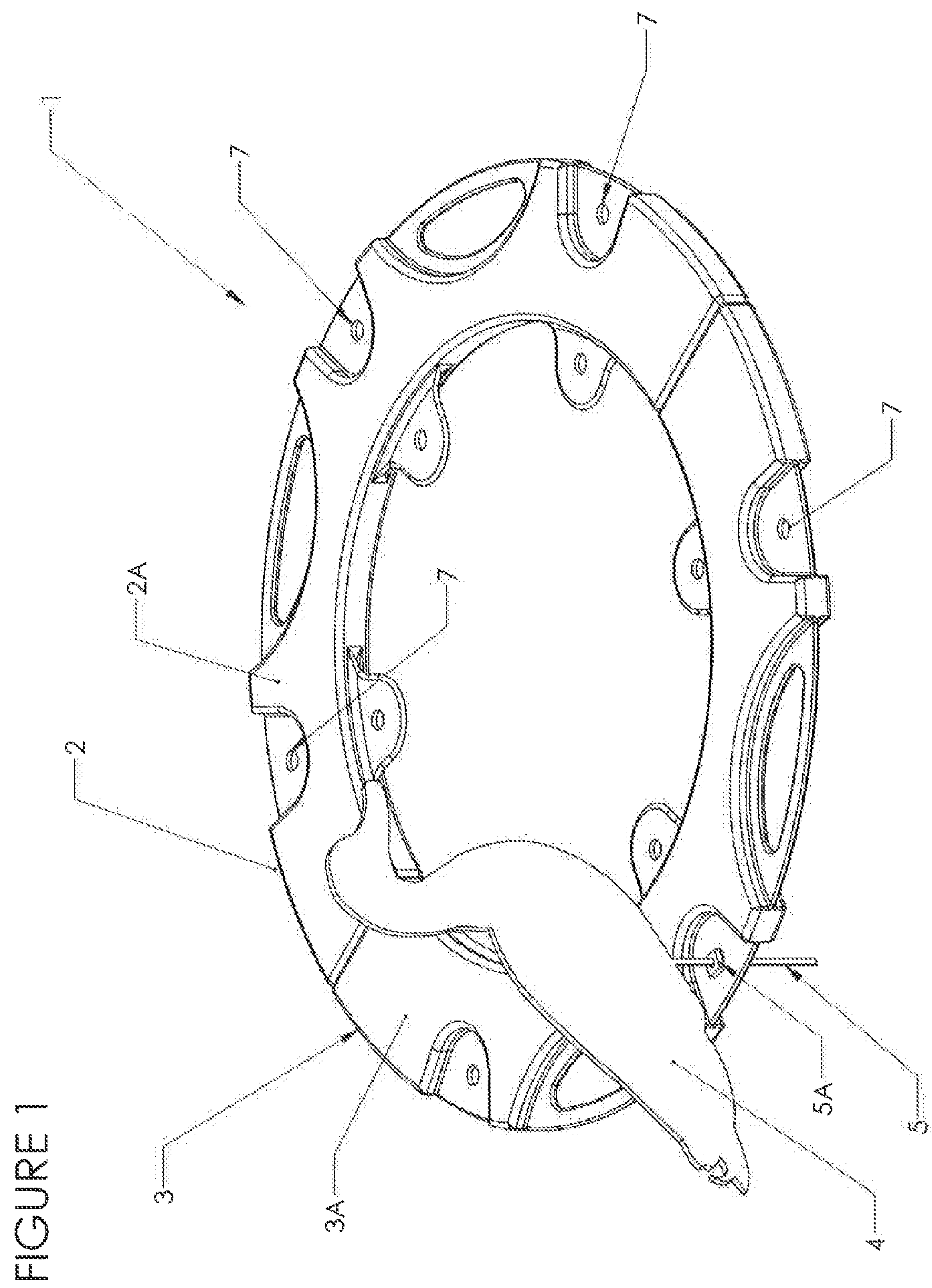
FIG. 1 is an isometric top view of a circular decoy buoy in a flat or open configuration with a decoy.
Figure 2:
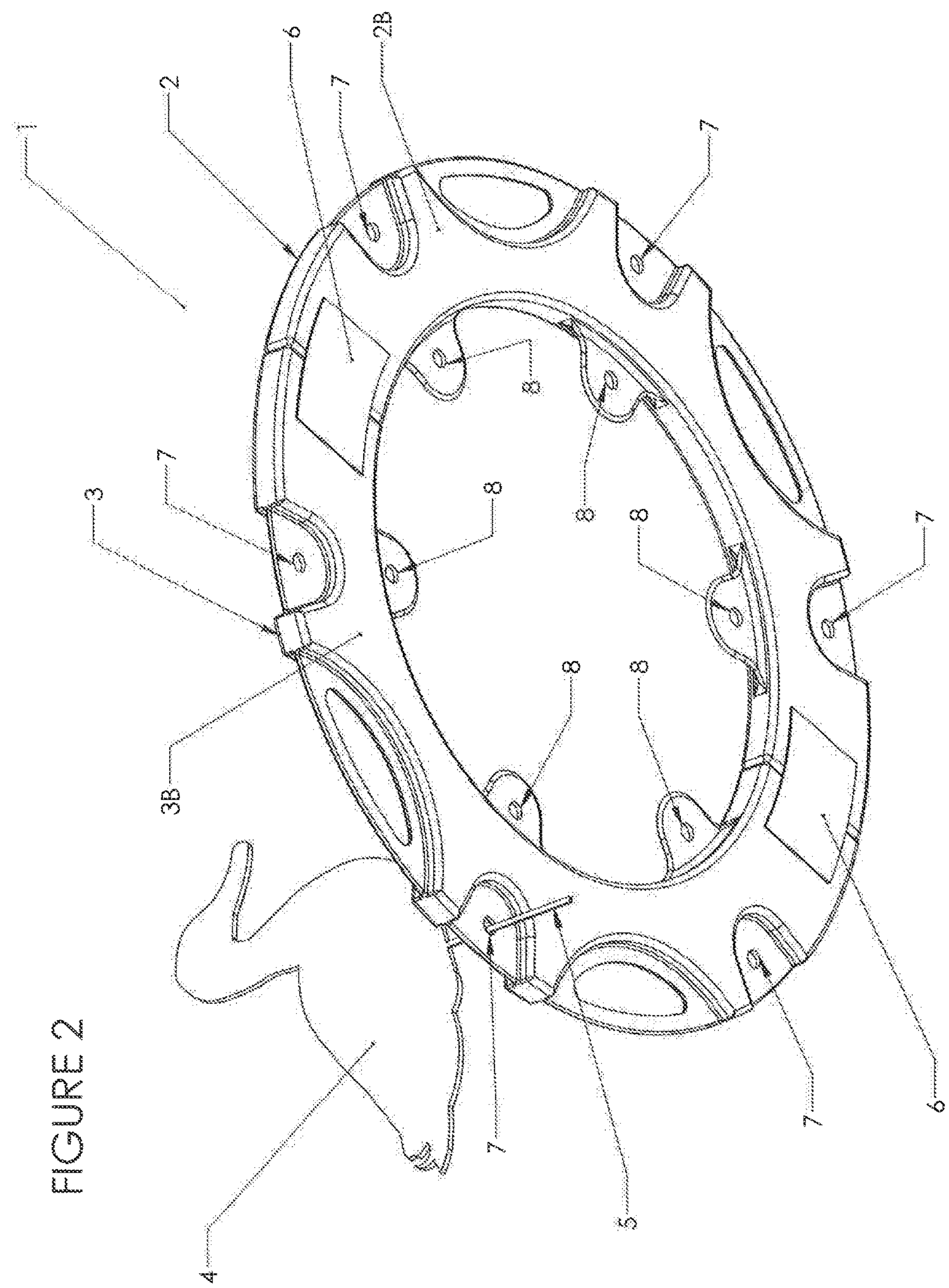
FIG. 2 is an isometric bottom view of a circular decoy buoy in a flat or open configuration with a decoy showing hinges.
Figure 3:
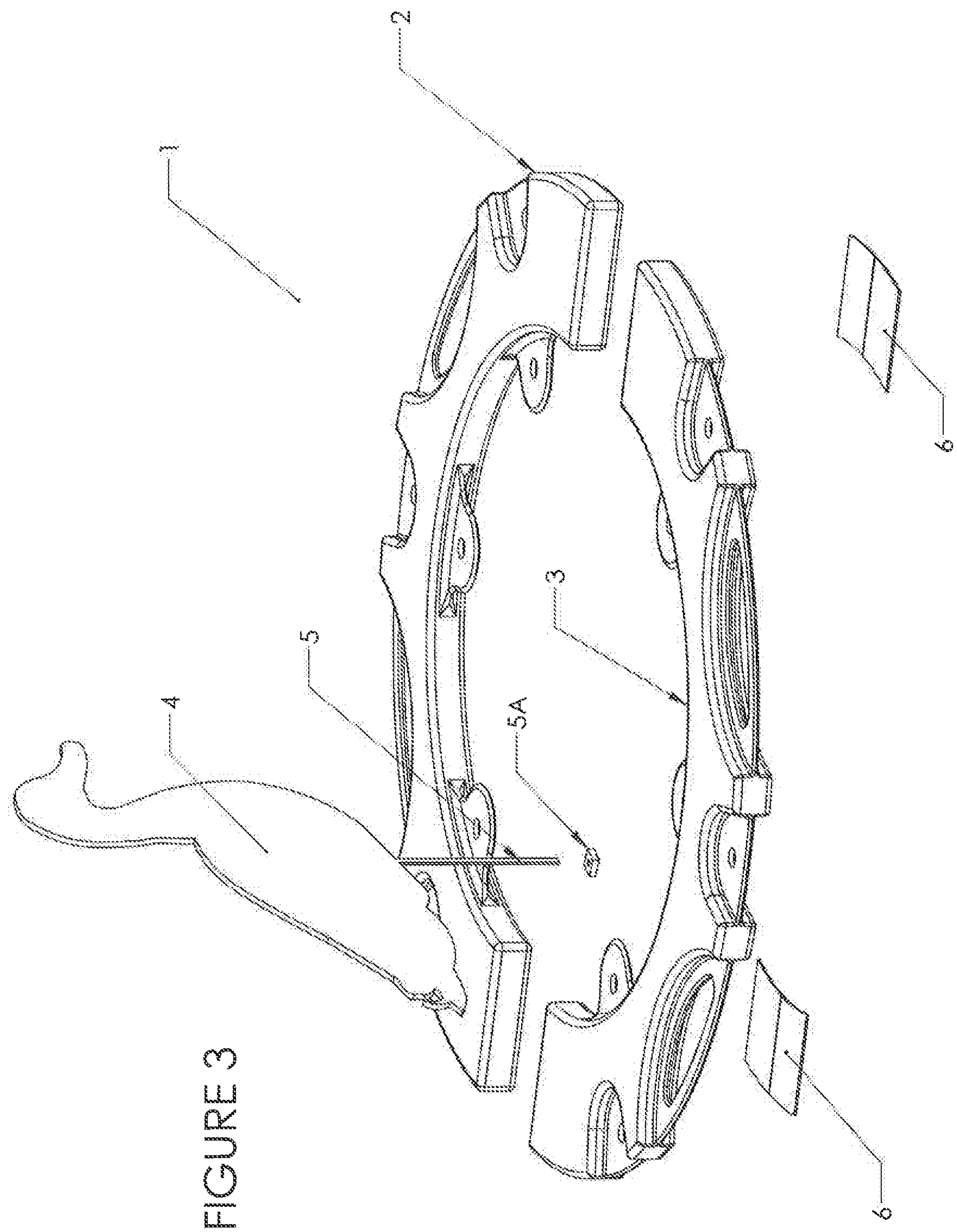
FIG. 3 is an isometric exploded top view of a circular decoy buoy in a flat or open configuration with a decoy.

Referring now to the drawings in detail, wherein like reference numerals refer to like elements throughout, FIGS. 1-3 show a first embodiment of the claimed invention. More specifically, referring to FIGS. 1-3, the decoy buoy 1 is formed by a first generally "C" shaped symmetrical half ring decoy buoy section 2, and a second generally "C" shaped symmetrical half ring decoy buoy section 3. Decoy buoy sections 2, 3 are joined using an offset hinge member 6 as shown in FIG. 2. A decoy 4 comprising a stake 5 and a stake stopper 5A are mounted through one of the mounting bores 7 in the decoy buoy 1.

Figure 5:
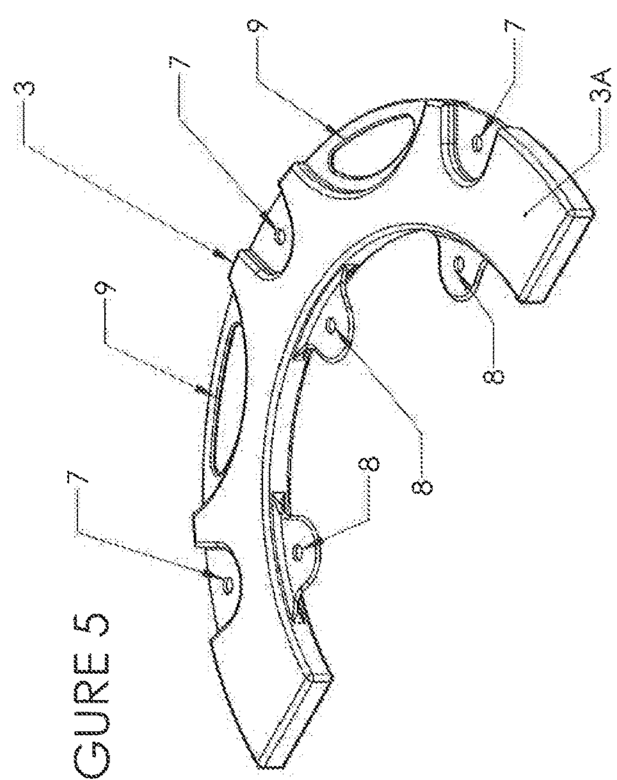
FIG. 5 is an isometric view of a half-ring section of a circular decoy buoy.
Figure 4:
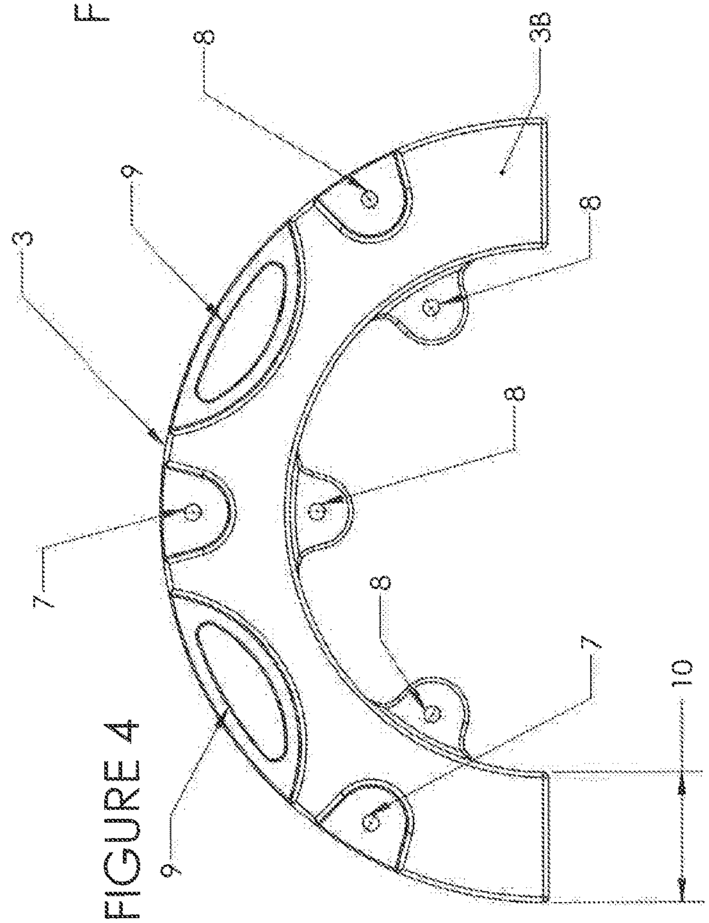
FIG. 4 is a bottom view of a half-ring section of a circular decoy buoy.
Figure 6:
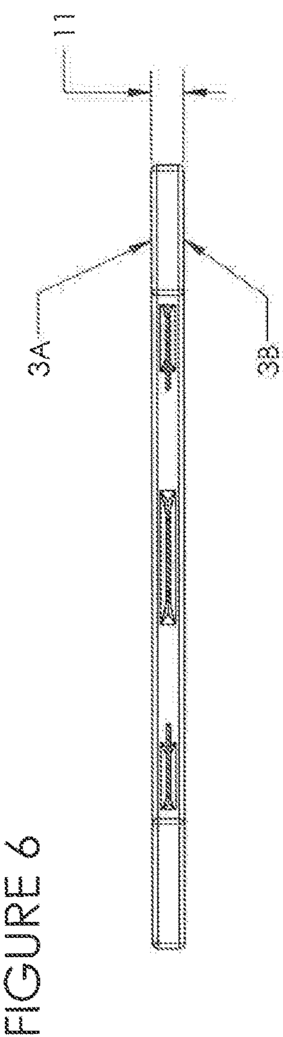
FIG. 6 is a side view of a half-ring section of a decoy buoy.
Figure 7:
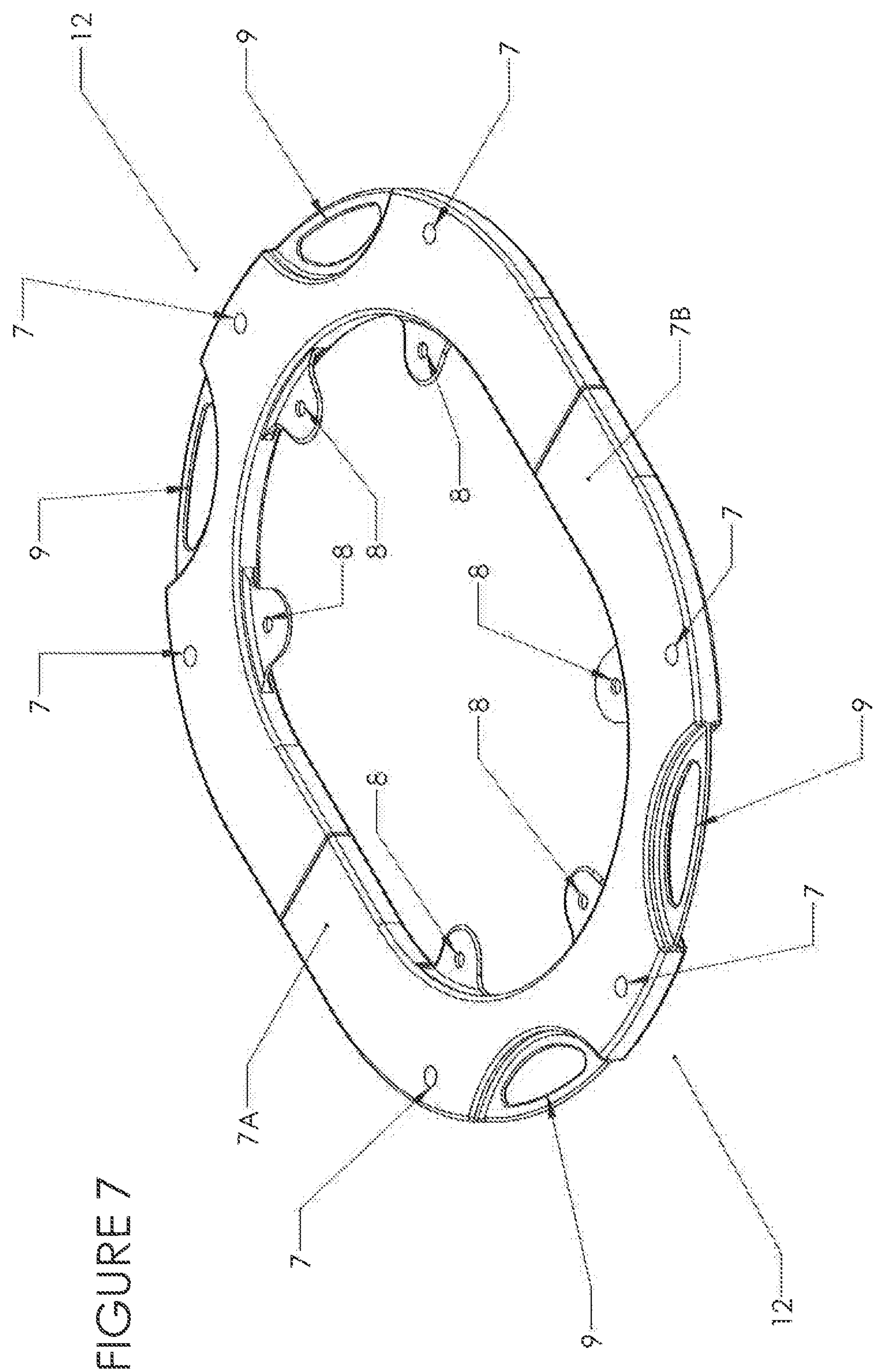
FIG. 7 is an isometric top view of an oval shaped decoy buoy in a flat or open configuration.
Figure 8:
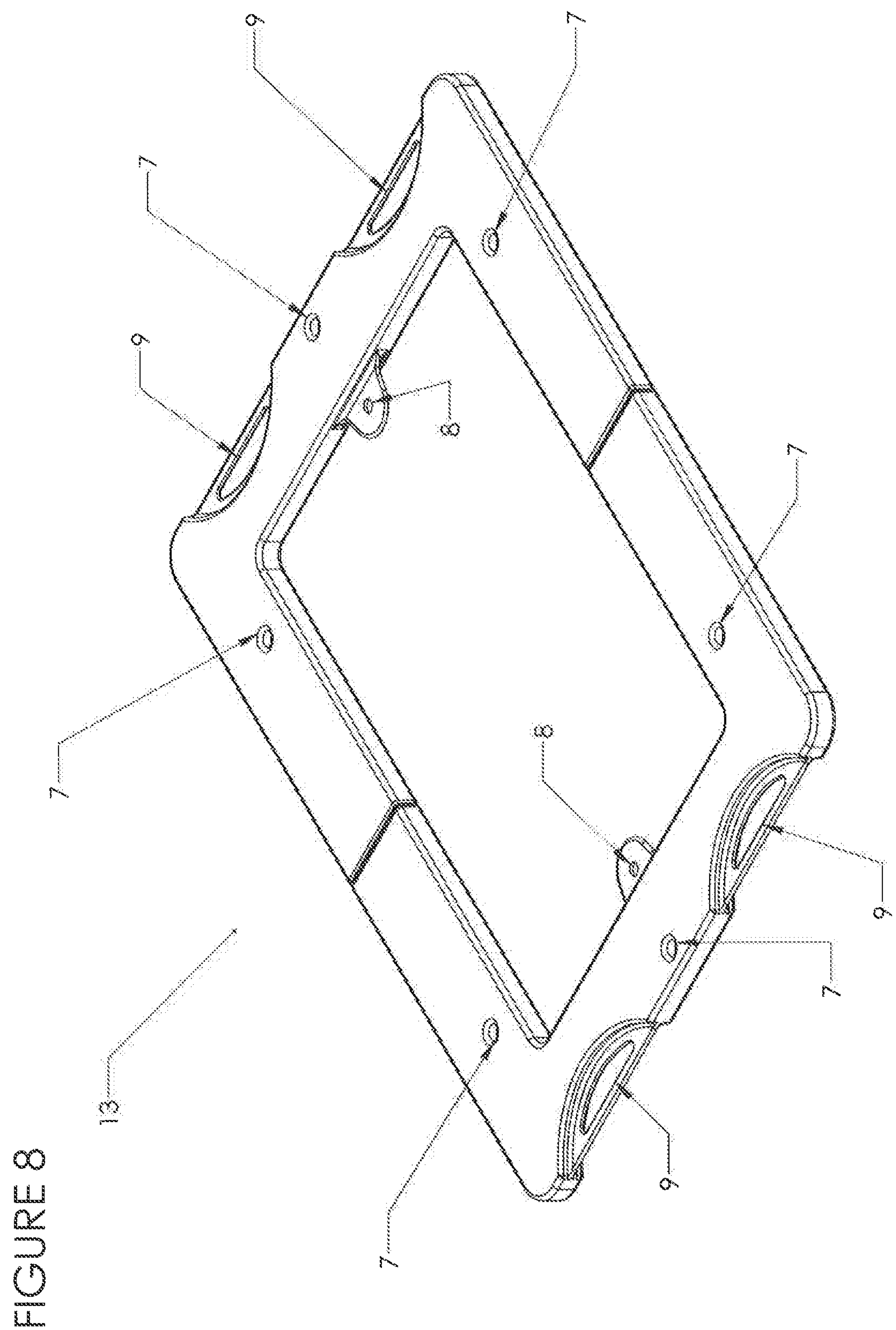
FIG. 8 is an isometric top view of a rectangular shaped decoy buoy in a flat or open configuration.

Referring now to FIGS. 4, 5, & 6, each "C" shaped decoy buoy section 2, 3 may comprise half of a round circle. Alternately, decoy buoy sections 2, 3 may be shaped like the letter "U" having elongated straight portions or may form half of an oval as shown in FIG. 7. Additionally, decoy buoy sections 2, 3 can be any suitable rounded or sided shape that has a leg that starts in a first direction 7A and ends in a substantially opposite direction 7B. It is expressly understood that decoy buoy sections could include non-circular shapes like the half rectangles shown in FIG. 8. Half squares, half diamonds, half hexagons etc. are also understood to be alternate acceptable shapes for the decoy buoy sections.

Figure 9:
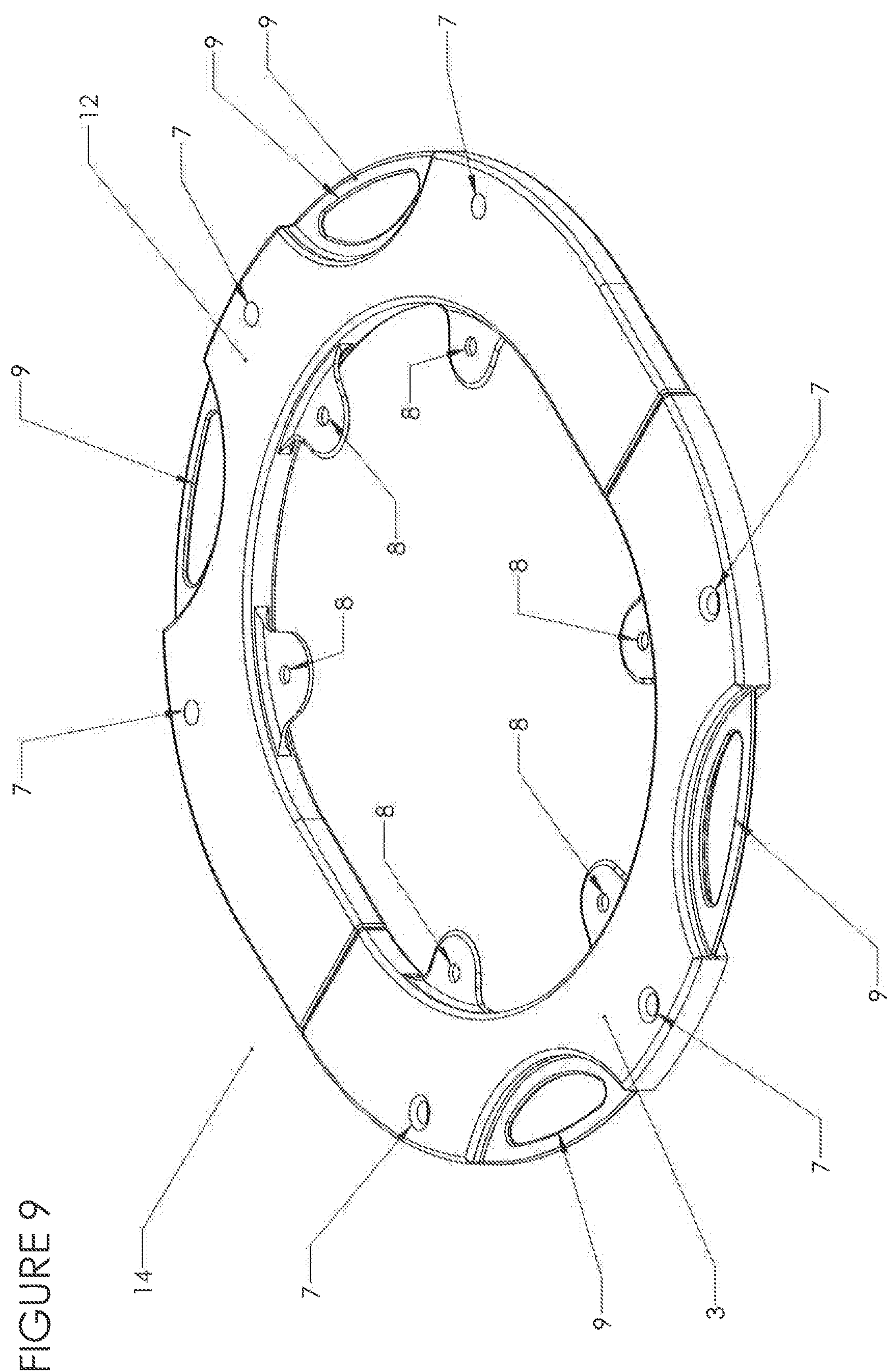
FIG. 9 is an isometric top view of a non-symmetrically shaped decoy buoy in a flat or open configuration.

Referring now to FIG. 9, decoy buoy section 2 and decoy buoy section 3 are non-symmetrical. It is understood that it may be desirable to configure the decoy buoy with non-symmetrical decoy buoy sections.

Referring to FIGS. 4, 5, & 6 each decoy buoy section 2, 3 may be constructed so that it has a first opposing face 3A and a second opposing face 3B, each face each having a width 10 that is generally greater than or equal to the height of the decoy buoy section. Each first 3A and second face 3B may be generally planar in nature, concave, convex, or some combination thereof. A plurality of bores 7 extending transversely from said first face 3A to said second face 3B may be biased towards the outside of each decoy buoy section. A second plurality of bores 8 extending transversely from one face to the other may be biased towards the inside of each decoy buoy section.

Referring to FIG. 2 bores 7 & 8 are sized to receive a stake 5 from a two dimensional or three dimensional decoy 4, an offsetting stabilizing weight, or an anchoring means. Said stake 5 may be provided with means 5A to adjust the height of the decoy of the stake. Adjustment means 5A may comprise a press-fit bushing, a length of hose, a flat piece having a diameter that is smaller than the diameter of the stake or any other suitable means.

Figure 11:
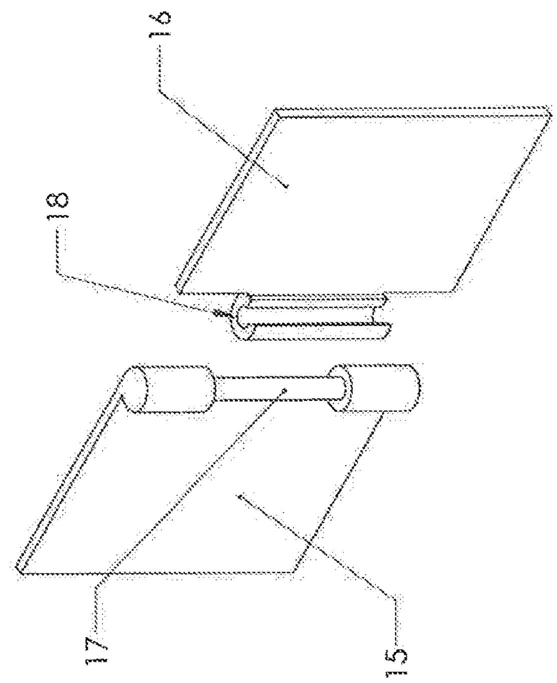
FIG. 11 is an isometric exploded view of a two piece hinge in a flat or open configuration.
Figure 13:
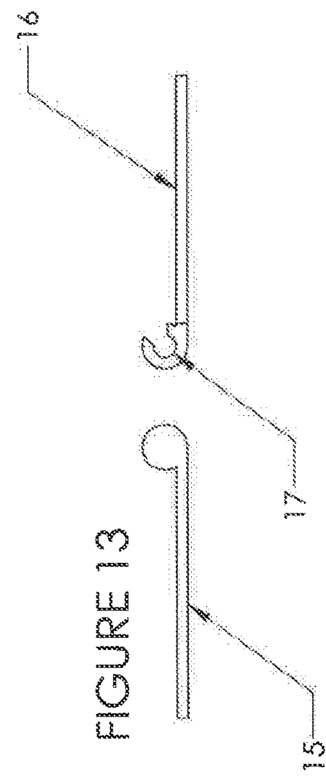
FIG. 13 is an exploded end view of a two piece hinge in a flat or open configuration.
Figure 10:
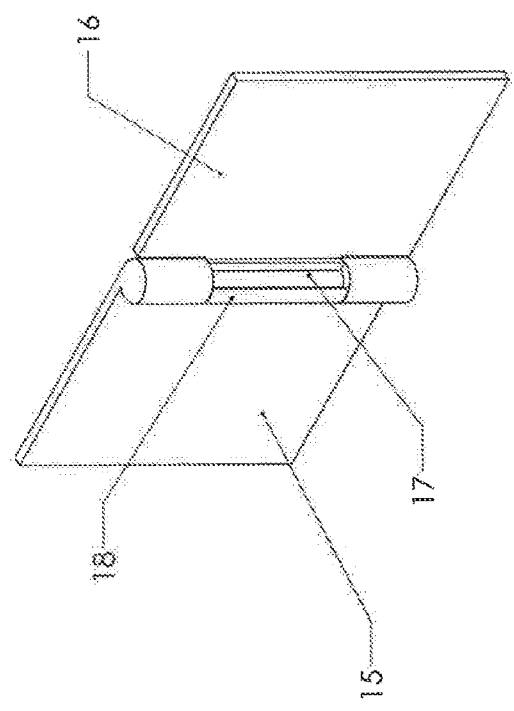
FIG. 10 is an isometric view of a two piece hinge in a flat or open configuration.
Figure 12:
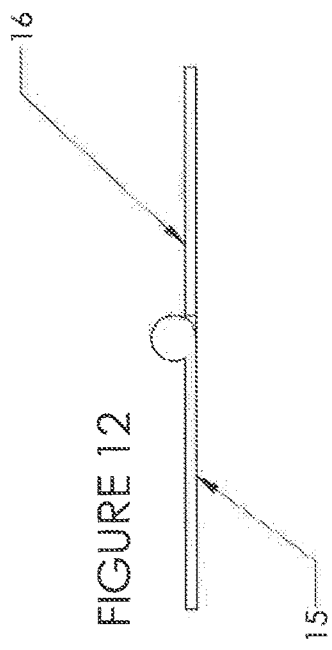
FIG. 12 is an end view of a two piece hinge in a flat or open configuration.

Referring to FIGS. 2 and 3, the hinge 6 may be constructed as a single piece. Such hinges are often referred to as living hinges, self-hinges, and integral hinges. The hinge 6 may be fixed to the decoy buoy sections 2, 3 by mechanical fasteners, bonding, ultrasonic welding or any other suitable means. As shown in FIGS. 10, 11, & 13 the hinge may also be integrally molded to the decoy buoy sections 2, 3 with the "C" shaped elements 18 and from the same or another thermoplastic material. Referring now to FIG. 23, when placed in the water, the hinge portion 20 may be placed face down into the water so that the decoy buoy section 2, 3 end portions 19, 21 abut each other and prevent the formed ring from collapsing under the weight of the decoys.

Referring to FIGS. 16, 17, 18, 19, and 20 it is further understood that the half rings may be folded about the hinges into a closed configuration. The decoy buoy sections 2, 3 may be formed from buoyant materials such as lightweight polymer materials such as polyethylene, LDPE, HDPE, expanded polystyrene foam as well as a host of other materials. The decoy buoy sections 2, 3 may be formed by injection molding, blow molding, thermoforming as well as a host of other preferred methods. They decoy buoy sections 2, 3 may be of solid construction throughout or may be formed to have hollow sections that trap air and facilitate buoyancy.

In another preferred embodiment, each decoy buoy section is joined by a hinge constructed in two pieces as shown in FIGS. 10, 11, 12 & 13: a pin portion 17 and a complimentary receiving portion 18. In this embodiment, one end of the decoy buoy section may terminate in a hinge having a pin portion 15 and the opposite end of the half ring may terminate in a complimentary portion 16 that rotatably mates with a pin portion. Due to the symmetrical placement of the hinge pieces on the ends of the decoy buoy section, the pin portion 15 of one end may mate with the receiving portion 18 of the opposite decoy buoy section.

Figure 15:
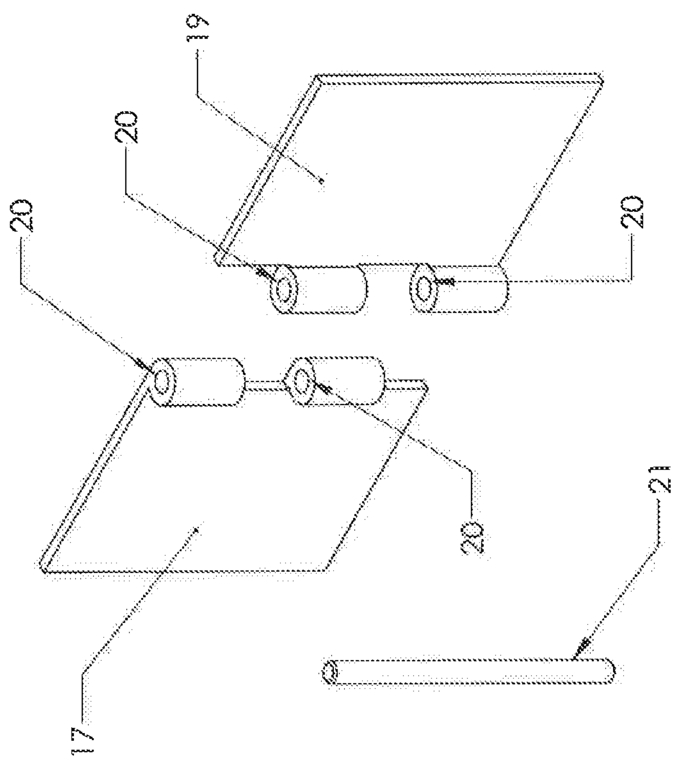
FIG. 15 is an isometric exploded view of a three piece hinge in a flat or open configuration.
Figure 14:
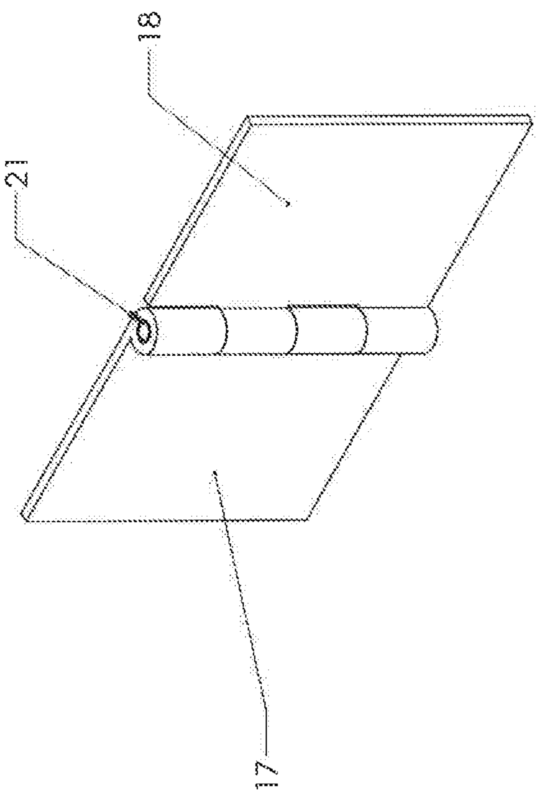
FIG. 14 is an isometric view of a three piece hinge in a flat or open configuration.
Figure 24:
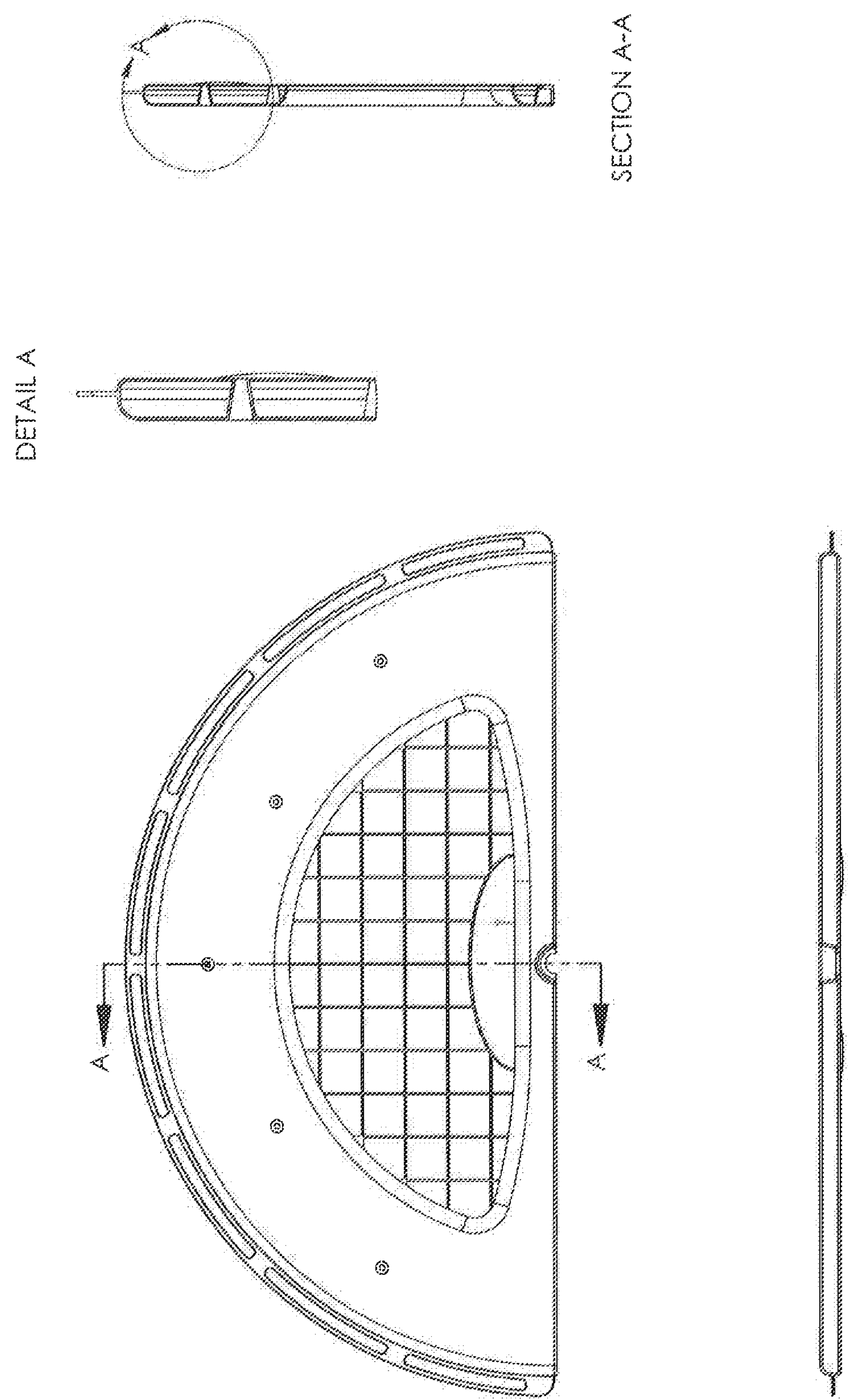
FIG. 24 is a top view of a half-ring embodiment of the decoy buoy that employs an internal netting design as opposed to a solid design or an open design.

In another preferred embodiment, each decoy buoy section 2, 3 is joined by a hinge constructed in three pieces as shown in FIGS. 14, & 15, a pin 21 and complimentary receiving portions 20. In this embodiment, one end each decoy buoy section 2, 3 may terminate in a hinge having complimentary receiving portion 20 that rotatably mates with pin portion 21. Due to the symmetrical placement of the hinge pieces on the ends of the decoy buoy sections, the pin 21 may mate with the receiving portions 21 of each opposite decoy buoy section.

What is claimed is:

1. A decoy buoy for holding at least one waterfowl decoy comprising:

a first buoyant decoy buoy section and a second buoyant decoy buoy section; each of said first and second decoy buoy sections further comprising a first face, a second opposite face and a first and second terminus, each of said decoy buoy sections having a plurality of bores extending from said first face to second face, each of the bores being adapted to receive at least one of: a decoy stake, an anchoring means, or a stabilizing weight; and a hinge joining first and second decoy buoy sections together at the first and second terminus.

2. The decoy buoy of claim 1 wherein each of the buoy sections is constructed with a hollow core to provide buoyancy.

3. The decoy buoy of claim 1 wherein at least one of the buoy sections has a non-circular shape.

4. The decoy buoy of claim 1 wherein each of said buoy sections is constructed of a rigid expanded polymer foam.

5. The decoy buoy of claim 1 wherein each of said buoy sections is constructed with a hollow core and of rigid foam.

6. The decoy buoy of claim 1 wherein each of said buoy sections is constructed from low density polyethylene.

7. The decoy buoy of claim 1 wherein each of said buoy sections is constructed from high density polyethylene.

8. The decoy buoy of claim 1 wherein said hinge comprises a living hinge.

9. The decoy buoy of claim 1 wherein said first terminus of buoy section comprises a hinge half having a pin portion and second terminus comprises a pin receiving portion.

10. The decoy buoy of claim 1 wherein said each terminus of each buoy section comprises a pin receiving portion and the buoy sections are joined by at least one hinge pin.

11. The decoy buoy of claim 1 wherein at least one of the buoy sections is constructed having an integral handle suitable for carrying said decoy buoy.

12. A decoy buoy for holding at least one waterfowl decoy comprising:

first and second first buoy sections further comprising a first face and a second opposite face a first and second terminus;

an inner periphery and an outer periphery;

a buoy section height that is equal to or less than the width between its outer periphery and its inner periphery;

a plurality of bores extending from said first generally planar face to second generally planar face, each of the plurality of bores being adapted to receive at least one of: a decoy stake, an anchoring means, or a stabilizing weight;

a partially hollow construction; and a hinge joining the first and second buoy sections together at the first and second terminus, each of said hinge means being mounted on complimentary generally planar faces.

13. The decoy buoy of claim 12 wherein at least one of said buoy sections is non-circular.

14. The decoy buoy of claim 12 wherein said hinge comprises a living hinge.

15. The decoy buoy of claim 12 wherein said first terminus of decoy buoy section comprises a hinge half having a pin portion and second terminus comprises a pin receiving portion.

16. The decoy buoy of claim 12 wherein said each terminus of each decoy buoy section comprises a pin receiving portion and the buoy sections are joined by at least one hinge pin.

17. The decoy buoy of claim 12 wherein at least one of said buoy sections is constructed having an integral handle suitable for carrying said decoy buoy.

18. A buoyant decoy system comprising:

a first buoy section and a second buoy section each comprising:

a first generally planar face and a second generally planar opposite face;

a first and second terminus;

an inner periphery and an outer periphery;

a buoy section height that is equal to or less than the width between its outer periphery and its inner periphery;

a plurality of bores extending from said first generally planar face to second generally planar face, each of the plurality of bores being adapted to receive at least one of: a decoy stake, an anchoring means, or a stabilizing weight;

a partially hollow construction;

a hinge means joining first and second buoy sections together at the first and second terminus, each of said hinge means being mounted on complimentary generally planar faces, and;

at least one decoy having a stake, said stake partially received within one of said plurality of bores.

19. The system of claim 18 wherein the decoy is two dimensional.

20. The system of claim 19 wherein the height of the stake is adjustable.

21. The system of claim 18 wherein the decoy is three dimensional.

22. The system of claim 21 wherein the height of the stake is adjustable.

* * * * *